United States Patent
Zitzelsberger et al.

(10) Patent No.: US 10,297,053 B1
(45) Date of Patent: May 21, 2019

(54) SCALABLE MULTI-THREADED EVALUATION OF VECTORIZED DATA FLOW GRAPHS

(71) Applicant: Pixar, Emeryville, CA (US)

(72) Inventors: Florian Zitzelsberger, Berkeley, CA (US); George ElKoura, Berkeley, CA (US)

(73) Assignee: Pixar, Emeryville, CA (US)

( * ) Notice: Subject to any disclaimer, the term of this patent is extended or adjusted under 35 U.S.C. 154(b) by 93 days.

(21) Appl. No.: 15/151,354

(22) Filed: May 10, 2016

(51) Int. Cl.
*G06T 1/20* (2006.01)
*G06T 9/00* (2006.01)
*G06T 11/20* (2006.01)

(52) U.S. Cl.
CPC .............. *G06T 11/206* (2013.01); *G06T 1/20* (2013.01); *G06T 9/00* (2013.01); *G06T 2210/52* (2013.01)

(58) Field of Classification Search
CPC .................................................... G06T 11/206
USPC ......................................................... 345/440
See application file for complete search history.

(56) References Cited

U.S. PATENT DOCUMENTS

2004/0015929 A1* 1/2004 Lewis ...................... G06F 8/314
717/156
2016/0154896 A1* 6/2016 Simitsis ............ G06F 17/30958
707/741

OTHER PUBLICATIONS

Elkoura, George, "Presto Execution System: An Asynchronous Computation Engine for Animation," Pixar Animation Studios; http://www.multithreadingandvfx.org/course_notes/PrestoExecAnAsynchronousComputationEngineforAnimation-SIGGRAPH2013.pdf; Jul. 24, 2013, 17 pages.
Watt, Martin, et al., "The Presto Execution System: Designing for Multithreading, Chapter 3, Multithreading for Visual Effects," CRC Press; Jul. 29, 2014, 41 pages.

* cited by examiner

*Primary Examiner* — Shivang I Patel
(74) *Attorney, Agent, or Firm* — Kilpatrick Townsend & Stockton LLP

(57) ABSTRACT

Provided herein are methods, systems, and computer products for evaluating nodes concurrently using a modified data flow graph. The modified data flow graph can identify independent nodes that can run as separate tasks. However, rather than relying on declared dependencies, embodiments herein can determine dependencies between segments of data elements in a data flow graph, and modify the data flow graph to take advantage of the determined dependencies. In such embodiments, the data elements can be divided into segments. By separating data elements into segments, nodes that previously depended on each other can be evaluated concurrently when independent segments are identified.

21 Claims, 15 Drawing Sheets

SCALABLE MULTI-THREADED EVALUATION OF VECTORIZED DATA FLOW GRAPHS

BACKGROUND

A data flow graph is a graphical representation of the flow of data through a system. Data flow graphs are used to illustrate data flow schemes, which allow for systems to identify parallelism in computations. In particular, data flow schemes can determine an order to perform computer processes based on a configuration of a data flow graph. Rather than representing computer processes as a sequence of instructions, data flow graphs can represent computer processes as nodes that are connected to each other by edges based on their data dependencies.

Conventionally, a data flow graph can allow for parallelization where a user has declared no dependency. Declared dependencies can be received by a computer system as guidance to which computer processes depend on other computer processes. The computer system can determine, using the declared dependencies, that two or more nodes can run concurrently when the nodes are not connected to each other by an edge. In such an example, the computer system can then evaluate each node as a separate task. In some examples, a separate task can run on a separate thread. However, by limiting parallelization to declared dependencies, the computer system can only function as efficiently as the dependencies received. Thus, there is a need for greater parallelization to improve the speed of evaluations for data flow graphs.

SUMMARY

Provided herein are methods, systems, and computer products for evaluating nodes concurrently using a modified data flow graph. The modified data flow graph can identify independent nodes that can run as separate tasks. However, rather than relying on declared dependencies, embodiments herein can determine dependencies between segments of data elements in a data flow graph, and modify the data flow graph to take advantage of the determined dependencies. In such embodiments, the data elements can be divided into segments. A segment can be associated with a processor such that the segment can be evaluated by the processor. By separating data elements into segments, nodes that previously depended on each other can be evaluated concurrently when independent segments are identified. Such embodiments can increase evaluation efficiency because some dependencies can be eliminated.

For example, a first node and a second node can be received by an execution system. The first node and the second node can be associated with a number of data elements. The execution system can divide the data elements into segments such that the segments are independent of each other.

In some examples, the second node can depend on the first node. In such an example, the first node can be associated with a first affects mask, which indicates one or more data elements of the data elements that are modified by the first node. In addition, the second node can be associated with a second affects mask, which indicates one or more data elements of the data elements that are modified by the second node.

In some examples, an invocation of the second node can be generated for each segment that includes a data element indicated by the second affects mask. In addition, an invocation of the first node can be generated for each segment that includes a data element indicated by the first affects mask.

The execution system can identify one or more invocations of the second node that depend on one of the invocations of the first node using the first affects mask and the second affects mask. The execution system can evaluate the invocations of the first node and the invocations of the second node based on the identified dependencies. In some examples, the invocations of the second node that do not depend on the invocations of the first node can be evaluated concurrently with the invocations of the first node.

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

Illustrative embodiments are described in detail below with reference to the following figures.

TERMS

Figure 1:
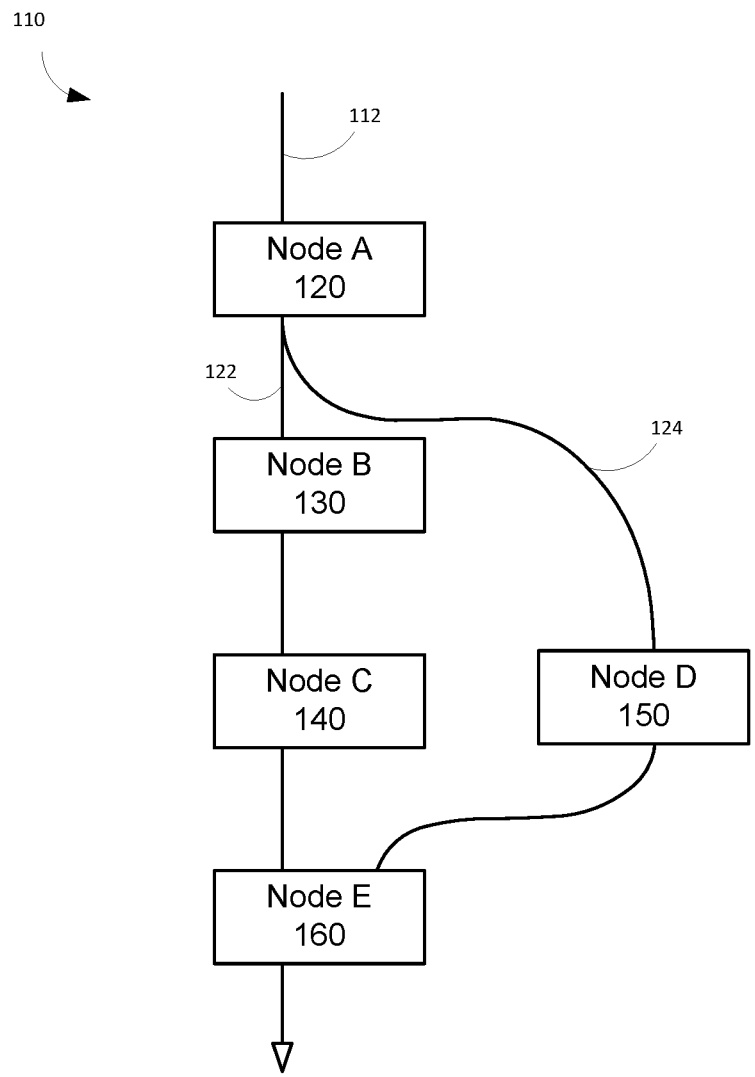
FIG. 1 illustrates an example of a data flow graph that can have further parallelization identified by embodiments of the present disclosure.

A data flow graph is a directed graph that includes a plurality of nodes connected by edges. The edges indicate dependencies between nodes. Data elements flow through a data flow graph from the top of the data flow graph to the bottom of the data flow graph. The top of the data flow graph includes one or more parent nodes that do not include an additional parent node. The bottom of the data flow graph includes one or more leaf nodes. A dependency in a data flow graph is fulfilled when a node does not have a dependency or the invocation that it depends on is completed.

A node corresponds to one or more functions. A child node is a node that depends from at least one other node. Each node has zero or more child nodes. A parent node is a node that includes a child node. The parent node is denoted as the parent of the child node. A branch node is a node that has a child node. A branch includes one or more branch nodes that are in series. A leaf node is a node that does not have a child node.

A task is a logically discrete section of computational work. In some examples, a task is a program or a set of instructions that is executed by a processor. A processor is a hardware element that executes operations (e.g., based on software) as a separate process from other processors. A processor can execute a single task at a time, per component of the processor. A pipeline process includes one or more tasks that are to be evaluated by a single processor.

DETAILED DESCRIPTION

The present disclosure relates generally to methods and system for evaluating a data flow graph in parallel. In particular, for methods and systems for modifying a data flow graph in order to identify segments of data elements that are independent with respect to dependent nodes.

Provided herein are methods, systems, and computer products for evaluating nodes concurrently using a modified data flow graph. The modified data flow graph can identify independent nodes that can run as separate tasks. However, rather than relying on declared dependencies, embodiments herein can determine dependencies between segments of data elements in a data flow graph, and modify the data flow graph to take advantage of the determined dependencies. In such embodiments, the data elements can be divided into segments. A segment can be associated with a processor such that the segment can be evaluated by the processor. By separating data elements into segments, nodes that previously depended on each other can be evaluated concurrently when independent segments are identified. Such embodiments can increase evaluation efficiency because some dependencies can be eliminated.

A data flow graph can be used in data processing to determine an order to process data elements. For example, a data flow graph can be used to determine how to evaluate one or more frames in an animated sequence.

I. Rigging

A frame of an animation sequence can include one or more objects that are animated during the animation sequence. A model can be created for an object in order to allow manipulation of the object by a user using a computer system. In some examples, the model can be a mesh. A mesh can include one or more data elements along a surface of the mesh. The one or more data elements can be specified in order to position the mesh. For example, a mesh can include a left arm of a character. By specifying the one or more data elements of the mesh of the left arm, the left arm can be put into a particular position. In some examples, an object can include several meshes (e.g., a body mesh, a left arm mesh, a right arm mesh, a left leg mesh, and a right leg mesh).

The data elements received by a data flow graph, as described above, can correspond to the data elements of one or more meshes. The one or more meshes can be associated with one or more objects. By changing the data elements, the one or more meshes can change the appearance of an object or a portion of an object associated with the one or more meshes. For embodiments with more than one mesh, the data elements for each mesh, and object, can be grouped together in a vector to be supplied to a computer system. The vector can be an array that appends each additional mesh after the previous mesh. In some embodiments, every data element in a vector is considered to be independent of every other data element in the same vector.

In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. A rig can be used to specify values associated with one or more data elements of a mesh. In some examples, a rig can take as input one or more animation variables (avars). For example, an avar can be an angle of a right arm mesh. The avar can be specified in order for a computer system to determine what the points of the right arm mesh should be when it is moved a particular angle away from its current position.

In some embodiments, an avar can be associated with a node of a data flow graph. The node can evaluate one or more points of a mesh based on the avar received. For example, a function can rotate an elbow. A node associated with the rotate function can apply the rotate function to the points of the elbow. The computer system can also determine how to combine multiple actions that are performed on a single mesh (e.g., a move and a rotate action).

II. Execution System

An execution system can include one or more processors and a memory. In some embodiments, the execution system can evaluate data elements for rendering an image. The execution system can compile, schedule, and evaluate a data flow graph. To compile the data flow graph, the execution system can convert human-readable objects into data structures that can be used for efficient repeated evaluations by one or more processors of the computer system. The result of compilation can be a data flow graph comprising nodes and edges. In some embodiments, a separate system can compile the data flow graph. In such embodiments, rather than the execution system generating a data flow graph, the execution system can receive a data flow graph associated with one or more functions.

FIG. 1 illustrates an example of a data flow graph 110 that can have further parallelization identified by embodiments of the present disclosure. As previously described, the data flow graph 110 can illustrate dependencies between nodes using edges. An edge can describe that an input of a first node requires an output of a second node. The data flow graph 110 includes node A 120, node B 130, node C 140, node D 150, and node E 160. Each node can be associated with one or more functions. For example, node A 120 can be associated with a first one or more functions and node B 130 can be associated with a second one or more functions. Each one or more functions can be performed by the associated node on data elements that are received along a data path 112. The data path 112 can split into multiple data paths, depending on the dependencies declared. For example, the data flow graph 110 illustrates the data path 112 splitting into two data paths: a left data path 122 and a right data path 124.

Each set of two nodes can include an edge that connects the two nodes. An edge can indicate that the nodes that the edge connects depend on each other. For example, node A 120 and node B 130 include an edge between them. The edge between node A 120 and node B 130 can illustrate that an output from node A 120 is used for node B 130. In addition, the data flow graph 110 can indicate that node C 140 depends on the output of node B 130, and node E 160 depends on the output of both node C 140 and node D 150. The data flow graph 110 can end after node E 160.

Edges coming out of a single node do not necessarily mean that all of the data elements are needed for the next node. In some examples, the data path 112 can flow all of the data elements between every node even though each node might only need a subset of the data elements. For example, an edge between node A 120 and node D 150 can include all of the data elements in the data path 112.

Scheduling can analyze the dependencies of the nodes in the data flow graph 110 to determine an order that the nodes can be evaluated. In other embodiments, the scheduling can determine a partial ordering in which the nodes can be evaluated. In other embodiments, the dependency analysis can occur when evaluating. For example, the scheduling can merely determine what nodes need to run, and the ordering can be left to be determined while evaluating. In some embodiments, the dependency analysis can occur at least partially in each of scheduling and evaluating.

As previously described, a schedule can include an order to evaluate one or more nodes. For example, in the data flow graph 110, scheduling can determine that node A 120 can be evaluated first because all of the other nodes either directly or indirectly depend on node A 120. Scheduling can further determine that node B 130 should be evaluated after node A 120. In some embodiments, scheduling can determine that node D 150 can be evaluated at the same time as node B 130 and/or node C 140. In such an embodiment, node C 140 can be scheduled to be evaluated after node B 130. Scheduling can further determine that node E 160 can be evaluated after both node C 140 and node D 150 are evaluated.

III. A Data Flow Graph with Masks

Embodiments herein can modify a data flow graph in order to allow for further parallelization. Modifications can be based on a mask that is associated with an output on a node and/or an edge. In some embodiments, a node with multiple outputs can include a different mask for each output. A mask can be a bitset that identifies one or more data elements. The bitmap can include a "1" for data elements identified and a "0" for data elements not identified. The bitmap can be the size of the data elements flowing through a data flow graph. In some embodiments, a mask can be an affects mask or a connection mask. An affects mask can be associated with an output on node, and identify one or more data elements that are modified by the node. In some embodiments, data elements that are not identified in an affects mask are not affected by the associated node. The connection mask can be associated with an edge, and identify one or more data elements that are to be used as input to a node that is connected to the edge.

Figure 2:
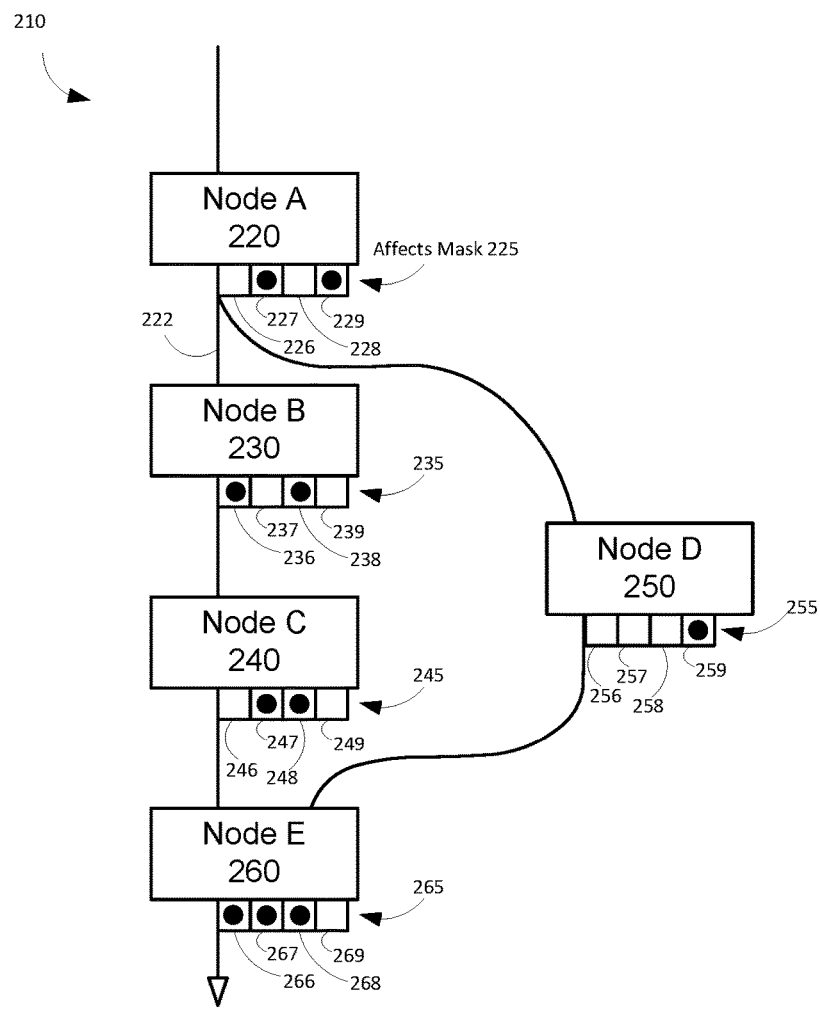
FIG. 2 illustrates an example of a data flow graph with only affects masks.

FIG. 2 illustrates an example of a data flow graph 210 with only affects masks. The data flow graph 210 includes node A 220, node B 230, node C 240, node D 250, and node E 260. However, unlike the data flow graph 110, the data flow graph 210 includes affects masks 225, 235, 245, 255, 265. For example, the output of node A 220 is associated with the affects mask 225. The size of an affects mask can be a number of segments that the data elements have been divided into. For example, the affects mask 225 can include segments 226, 227, 228, 229. The affects mask 225 can identify that one or more functions associated with node A 220 modifies at least one data element in each of the segments 227, 229. While the affects mask 225 includes dots for a positive indication and a blank for a negative indication for segment, one of ordinary skill in the art will recognize that the indications can be of other types (e.g., "1" and "0")

The output of node B 230 can be associated with the affects mask 235. The affects mask 235 can include segments 236, 237, 238, 239. The segments of the affects mask 235 can be the same as the segments of the affects mask 225. The affects mask 235 can identify that one or more functions associated with node B 230 modifies at least one data element in each of the segments 236, 238.

The output of node C 240 can be associated with an affects mask 245. The affects mask 245 can include segments 246, 247, 248, 249. The segments of the affects mask 235 can be the same as the segments of the other affects masks in the data flow graph 210. The affects mask 235 can identify that one or more functions associated with node C 240 modifies at least one data element in each of the segments 247, 248.

The output of node D 250 can be associated with an affects mask 255. The affects mask 255 can include segments 256, 257, 258, 259. The segments of the affects mask 255 can be the same as the segments of the other affects masks in the data flow graph 210. The affects mask 255 can identify that one or more functions associated with node D 250 modifies at least one data element of the segment 259.

The output of node E 260 can be associated with an affects mask 265. The affects mask 265 can include segments 266, 267, 268, 269. The segments of the affects mask 265 can be the same as the segments of the other affects masks in the data flow graph 210. The affects mask 265 can identify that one or more functions associated with node E 260 modifies at least one data element in each of the segments 266, 267, 268.

In some embodiments, an output of a node might not be associated with an affects mask. By not being associated with an affects mask, the node might not modify an incoming data element. In such embodiments, the node can use incoming data elements to compute a result that is not associated with a particular incoming data element. For example, a function associated with the node can compute a mean of two incoming data elements. The result would not modify a particular incoming data element while still depending on the particular incoming data element.

The data flow graph 210 does not illustrate any connection masks. However, in some embodiments, all of the edges include a connection mask. In such embodiments, the connection masks can mean one of two things. The connection masks can indicate that all of the data elements that flow through the data flow graph 210 are used as input into the connected node. Instead, the connection masks can indicate that only the data elements that are indicated by an affects mask are used as input into the connected node.

In some embodiments, a data flow graph can include a connection mask that is associated with an edge. The connection mask can include segments, similar to an affects mask. The connection mask can indicate one or more incoming data elements that are received as input to the connected node. As such, the connection mask can indicate that only a subset of the data elements are received as input to the connected node, and thus express dependencies in a different manner.

IV. Parallel Evaluation

As previously described, data flow graphs conventionally only allow parallelization where independent nodes are identified. For example, based on the topology of the data flow graph 110 of FIG. 1, node D 150 can be evaluated concurrently with either node B 130 or node C 160. However, none of the other nodes can be modified concurrently with another node.

Other multitasking strategies can be used, including per node, per branch, and per model. In per node, a task can be launched for each node in a network. In per branch, a task can be launched for each branch in a network. In per model, a task can be launched for each disconnected subgraph in a network.

Techniques described herein take advantage of undeclared dependencies that are determined based on dependencies of nodes, affects masks, and connection masks. In some embodiments, an execution system, as previously described, can receive a plurality of nodes associated with a data flow graph. The execution system can determine that two or more of the nodes can be evaluated in parallel based on affects masks associated with one or more nodes. In such embodiments, the execution system can determine that a segment of data elements can be independently evaluated by a node while another segment can be independently evaluated by another node. In particular, when two nodes do not modify the same data elements, the execution system can determine that the independent data elements can be evaluated concurrently without the user having to define their independence.

A. Segmentation

To implement the parallelization described above, the data elements can be divided into segments. In some embodiments, the data elements can be physically divided into segments. In other embodiments, the segments can be identified. In such embodiments, the execution system does not have to actually receive the data elements to perform segmentation. For example, the execution system can determine the segments based on a number of data elements the execution system will receive. This is possible because the actual values of the data elements do not matter in dividing the segments.

In some embodiments, the size of the segments can be adjusted. For example, the size of the segments can be based on hardware resources available at the time of execution.

In some embodiments, the data elements can be divided into segments using a grain size. The grain size can be the largest number of data elements that can optimally be evaluated by a single task. The grain size can be determined using auto tuning or machine optimization. In some embodiments, the data elements can be divided into segments that are less than, equal to, more than, or some combination thereof of the grain size. A person of ordinary skill in the art will recognize the amount of difference the segment sizes can be from the grain size to maintain efficiency.

The process of segmentation can also use segmentation hints. Segmentation hints can allow a user to indicate data elements that are not independent of each other and should not be split into different segments (i.e., indivisible). For example, a data element of a set of data elements can be linked to other data elements such that splitting the data elements into different segments would be inefficient or inappropriate. In such an example, a user can specify that the set of data elements should not be segmented. In some embodiments, the segmentation hints can override the grain size, i.e. an indivisible group would not be split even if the grain size is smaller than the size of the indivisible group.

A method to divide segments can include generating a segment for each indivisible group, as identified by segmentation hints. In some embodiments, data elements preceding or proceeding an indivisible group can be added to a segment with an indivisible group until the segment is around the grain size, as previously described. In other embodiments, a segment with an indivisible group can be combined with other segments that include indivisible groups until the combined segment is around the grain size, as previously described. The number of remaining data elements that are not included in a segment can be divided by the grain size to identify the number of segments to create with the remaining data elements.

For example, a vector can include ten data elements. The grain size can be two; and a segmentation hint can indicate that the first four entries are indivisible. Using the grain size and the segmentation hint, a segment can be created for the indivisible group. The number of remaining data elements (six) can be divided by the grain size (two) to identify the number of segments to create with the remaining data elements (4). Each set of two data elements out of the remaining data elements can be divided into a new segment.

B. Invocation

After the data elements have been divided into segments, invocations of nodes can be generated in order to modify the schedule or evaluation of the data flow graph, or the data flow graph itself. In the modified data flow graph, invocations of nodes can replace the nodes. In such embodiments, an invocation of a node can evaluate one or more data elements using one or more functions associated with the node. In some embodiments, an invocation of a node can evaluate a subset of data elements that includes less data elements than an affects mask associated with the node indicates. In such an embodiment, a first invocation of the node can be generated for the subset of data elements and a second invocation of the node can be generated for one or more of the data elements that are included in the affects mask but not included in the subset of data elements.

By allowing an invocation of a node to operate on a subset of data elements, embodiments herein can utilize the method of segmentation described above. A segment can be evaluated by an invocation of a node. In some embodiments, an invocation of each node can be generated for each segment. While such an embodiment can generate an invocation of a node for a segment that does not include a data element that is modified by the node, the affects mask associated with the node can cause the invocation to receive no data elements, which causes the execution system to essentially skip the invocation. In other embodiments, the execution system might not generate an invocation of a node for a segment that does not include a data element that is modified by the node, as indicated by an affects mask.

In some embodiments, invocations can be generated based on the masks. When a node includes an affects mask, an invocation can be generated for each segment.

C. Dependency Analysis and Evaluation

After the invocations are generated, the execution system can determine one or more dependencies between the invocations. To do so, the execution system can use at least one or more of an edge, an affects mask, a connection mask, or a combination thereof.

In some embodiments, a dependency between an invocation of a parent node and an invocation of a child node of the parent node can be determined by comparing affects masks associated with the parent node and the child node. When the child node modifies a data element, the execution system can determine that a segment that includes the data element will depend on the parent node if the parent node also modifies a data element in the same segment, and the connection mask also includes that data elements indicating that the element is sourced from the parent node. If the affects mask of the child node does not match with the affects mask of the parent node, the execution system can determine that an invocation of the child node for the segment can be evaluated before or at the same time as the parent node. In such an example, the child node can be allowed to be evaluated at least partially at the same time as the parent node.

In some embodiments, a node might include an input of a data element that the node does not modify (e.g., a data element identified in a connection mask and not in an affects mask). In such an embodiment, the connection mask can create a dependency between the node and all of the invocations of child nodes of the node.

In some embodiments, the dependency analysis can utilize a pull-based method. In such embodiments, the execution system can begin at one or more leaf nodes of a data flow graph. The execution system can then proceed from the bottom of the data flow graph to the top of the data flow graph, through each parent of each node to determine dependencies for nodes. The execution system can store the dependency information so that a modified schedule or evaluation of a data flow graph will not have to be regenerated every time new data elements values are received.

Once the dependencies for the invocations are determined, the execution system can associate a task with each invocation. A task can evaluate an invocation using a processor. In some embodiments, each invocation can independently evaluate a segment of data elements received by the invocation. In particular, an invocation can evaluate the data elements that are received by the invocation after an affects mask associated with a node associated with the invocation identifies the data elements to be modified by the node.

The execution system can evaluate an invocation when its dependencies are fulfilled. The dependencies of an invocation can be fulfilled when the invocation does not depend on another invocation. The dependencies of an invocation can also be fulfilled when one or more invocations, that an invocation depends on, are finished being evaluated.

Figure 14:
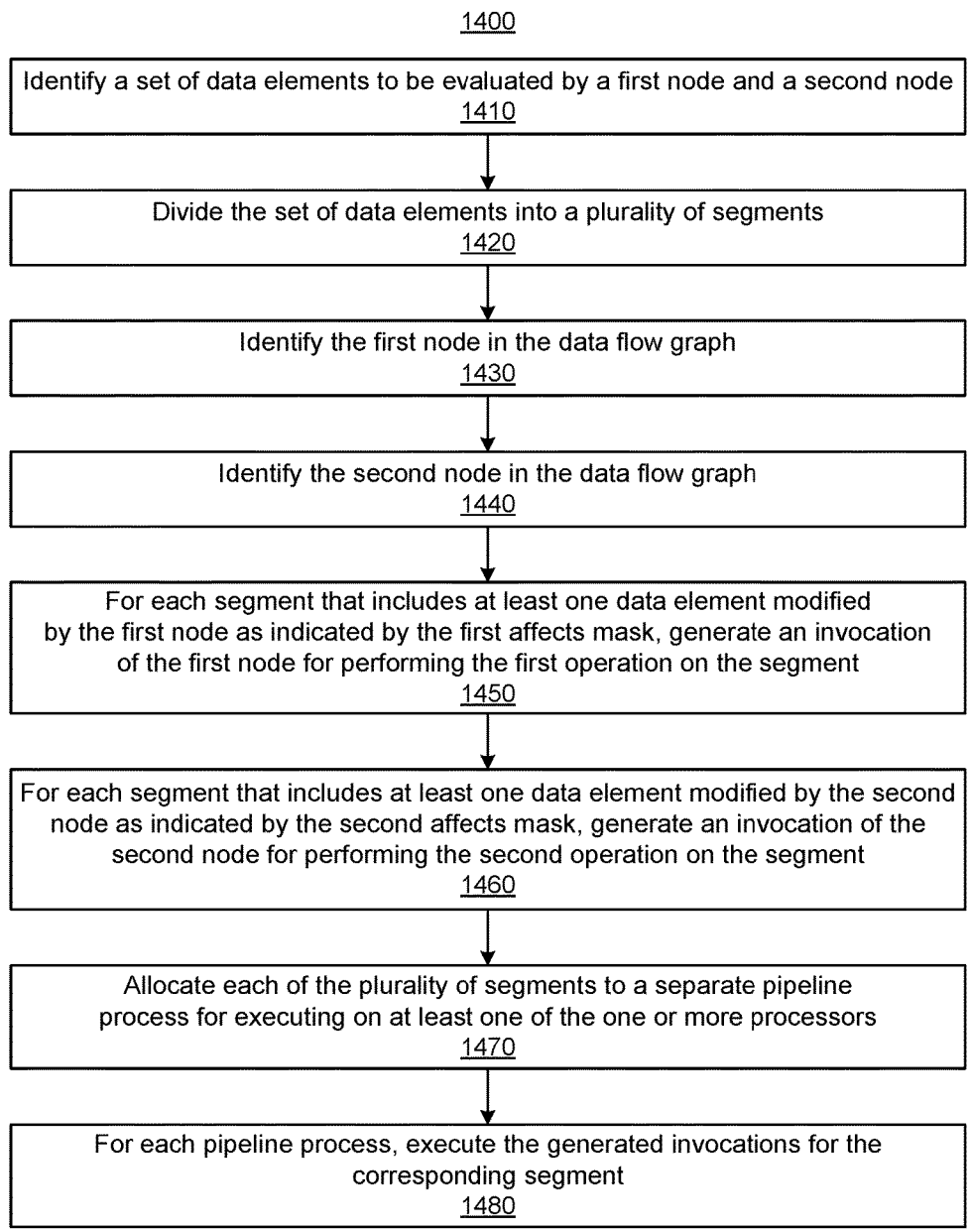
FIG. 14 is a flowchart illustrating an embodiment of a process for performing parallel execution of tasks executing on one or more processors of a computer system to concurrently evaluate dependent nodes in a modified data flow graph.

FIG. 14 is a flowchart illustrating an embodiment of a process 1400 for performing parallel execution of tasks executing on one or more processors of a computer system to concurrently evaluate dependent nodes in a modified data flow graph. In some aspects, the process 1400 can be performed by an execution system. While specific types of data elements might be discussed, one of ordinary skill in the art will appreciate that other types of data elements can be included in the process 1400.

Process 1400 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1400 can be performed under the control of one or more computer systems configured with executable instructions and may be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At 1410, the process 1400 can include identifying a set of data elements to be evaluated by a first node and a second node. In some embodiments, each data element of the set of data elements can correspond to a variable of a computer model defined by the data flow graph. In some embodiments, the computer model can include one or more meshes associated with one or more objects of a frame of an animated sequence. In such embodiments, the variable can identify a position of a data element on the one or more meshes. The second node can depend on the first node. In other words, a data element that is either modified or outputted by the first node can be required as an input to the second node.

At 1420, the process 1400 can further include dividing the set of data elements into a plurality of segments. Because the set of data elements are merely identified, the actual set of data elements might not be divided. Instead, an indication can be generated that identifies where each segment is in the set of data elements. In some embodiments, each segment can include a portion of the set of data elements. In other embodiments, a segment can include a single data element. The division can be based on a grain size and segmentation hints. In some embodiments, the grain size can be determined using auto tuning or machine optimization. In some embodiments, the segmentations hints can be received from a user. In other embodiments, the segmentations hints can be identified based on the set of data elements. For example, the set of data elements can include a portion that is indivisible because of a configuration of one or more data elements in the set of data elements.

At 1430, the process 1400 can further include identifying the first node in the data flow graph. The first node can correspond to a first operation. The first operation can be one or more operations. In some embodiments, the first node can be associated with a first affects mask. The first affects mask can indicate which data elements of the set of data elements are modified by the first node.

At 1440, the process 1400 can further include identifying the second node in the data flow graph. The second node can correspond to a second operation. In some embodiments, the second node can be associated with a second affects mask. The second affects mask can indicate which data elements of the set of data elements are modified by the second node.

At 1450, the process 1400 can further include generating an invocation of the first node for performing the first operation on each segment that includes at least one data element modified by the first node as indicated by the first affects mask. In some embodiments, each invocation of the first node can be run as a task. For example, a first invocation of the first node can be evaluated by a first processor while a second invocation of the first node can be evaluated by a second processor.

At 1460, the process 1400 can further include generating an invocation of the second node for performing the second operation on each segment that includes at least one data element modified by the second node as indicated by the second affects mask. In some embodiments, a first segment can be modified by the first node and not by the second node. In addition, a second segment can be modified by the second node and not by the first node. Similarly to an invocation of the first node, an invocation of the second node can be run as a task in some embodiments. For example, a first invocation of the second node can be evaluated by a third processor while a second invocation of the second node can be evaluated by a fourth processor. In some embodiments, the first processor or the second processor can replace the third processor or the fourth processor.

At 1470, the process 1400 can further include allocating each of the plurality of segments to a separate pipeline process for executing on at least one of the one or more processors. In some embodiments, the first segment can be allocated to a first pipeline process and the second segment can be allocated to a second pipeline process. In some embodiments, each pipeline process can be associated with a processor. For example, an invocation in a first pipeline process can be evaluated by a first processor while an invocation in a second pipeline process can be evaluated by a second processor.

At 1480, the process 1400 can further include executing the generated invocations for the corresponding segment for each pipeline process. In some embodiments, the first pipeline process can execute the invocation for the first node concurrently with the second pipeline process executing the invocation for the second node. In some embodiments, each pipeline process can be evaluated by a separate task.

In some embodiments, a third segment can be modified by the first node and by the second node. In such embodiments, the third segment can be allocated to a third pipeline process. In some embodiments, a third segment can be modified by the first node and by the second node. The third segment can be allocated to a third pipeline process.

The process 1400 can further include identifying a third node in the data flow graph. The third node can correspond to a third operation. In some embodiments, the third node can depend on the second node. In such embodiments, a connection between the second node and the third node can be associated with a connection mask. The connection mask can indicate that a data element of the set of data elements is input to the third node. In some embodiments, the third node does not use data elements of another segment to perform the third operation on any segment.

The process 1400 can further include generating an invocation of the third node for performing the third operation on a segment that includes the data element that is input to the third node, as indicated by the connection mask.

The process 1400 can further include identifying a third node in the data flow graph. The third node can correspond to a third operation. In some embodiments, the third node can depend on the second node. The third node can also be associated with a third affects mask. The third affects mask can indicate which data elements of the set of data elements are modified by the third node. In some embodiments, a connection between the second node and the third node can be associated with a connection mask. The connection mask can indicate that a data element of the set of data elements is input to the third node. In some embodiments, the third node does not use data elements of another segment to perform the third operation on any segment.

The process 1400 can further include generating an invocation of the third node for performing the third operation on each segment that includes at least one data element that is modified by the third node as indicated by the third affects mask. After generating an invocation of the third node, the execution system can establish a dependency between the segment and a segment that includes the data element that is input to the third node.

The process 1400 can further include generating an invocation of the first node for performing the first operation on each segment that does not include at least one data element modified by the first node as indicated by the first affects mask. In addition, the process 1400 can include generating an invocation of the second node for performing the second operation on each segment that does not include at least one data element modified by the second node as indicated by the second affects mask. In some embodiments, a first segment can be modified by the first node and not by the second node. In such embodiments, a second segment can be modified by the second node and not by the first node.

V. Examples of Parallel Evaluations

To illustrate some embodiments herein, node invocations can be generated for the data flow graph 210, as described above.

A. Affects Masks Only Example

Figure 3:
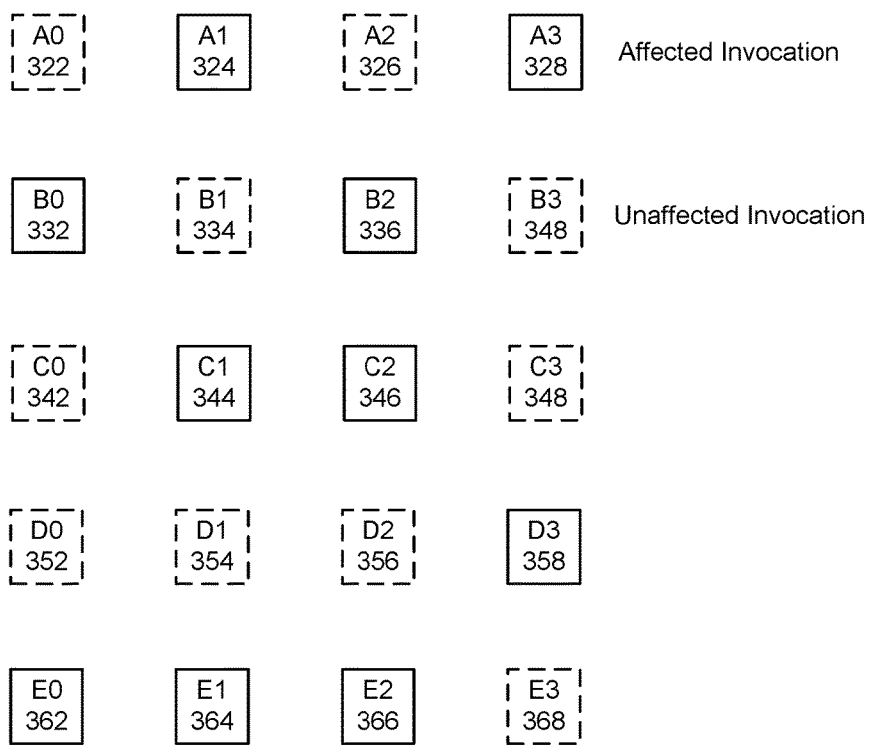
FIG. 3 illustrates an example of node invocations for a data flow graph with only affects masks.

FIG. 3 illustrates an example of node invocations for the data flow graph 210. In FIG. 3, invocations for each node have been generated for each segment. For example, node A 220 can have four invocations generated: A0 322, A1 324, A2 326, and A3 328.

Invocations with solid boundaries represent affected invocations, which indicate that an affects mask associated with a node associated with the invocation identifies a data element in a segment associated with the invocation; invocations with dotted boundaries represent unaffected invocations, which indicate that an affects mask associated with a node associated with the invocation does not identify a data element in a segment associated with the invocation. For example, A3 328 includes a solid boundary. Looking at FIG. 2, the segment 229, which is associated with A3 328, includes a dot, indicating that node A 229 modifies at least one data element that is included in the segment 229. For another example, B3 348 includes a dotted boundary. Looking at FIG. 2, a segment 239, which is associated with B3 348, does not include a dot, indicating that node B 230 does not modify at least one data element that is included in the segment 229.

Figure 4:
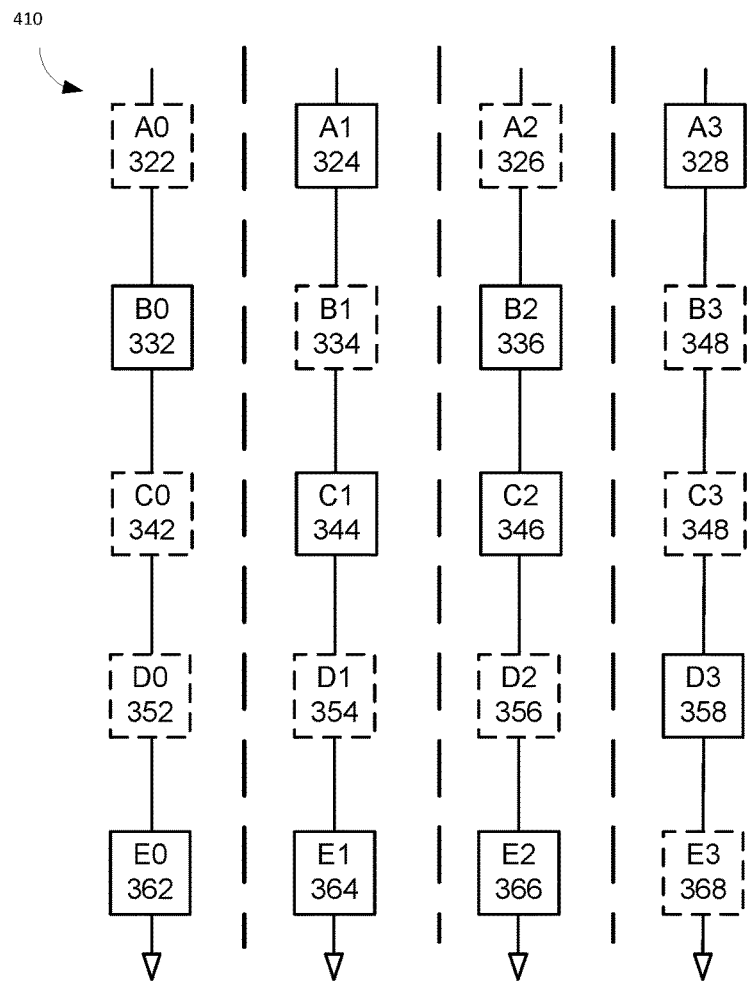
FIG. 4 illustrates an example of a modified data flow graph with unaffected nodes included.

FIG. 4 illustrates an example of a modified data flow graph 410 with unaffected nodes included. In FIG. 4, the nodes associated with each segment have been divided using a vertical dotted line. The segments can allow for four pipeline processes that can each be evaluated concurrently.

In some embodiments, determining the dependencies between invocations can begin at the invocations associated with the leaf nodes. For example, the modified data flow graph 410 includes node E 260, which is a leaf node. Because node E 260 either directly or indirectly depends on each other node, each pipeline process can include the dependencies of each invocation. However, some invocations can be ignored because the segments associated with the invocations do not include a data element that is modified by the invocations, which is indicated in the associated affects masks. For example, A0 322, C0 342, and D0 352 can be ignored because the invocations are unaffected. In such an example, only B0 332 and E0 362 would need to be evaluated in an associated pipeline process.

Figure 5:
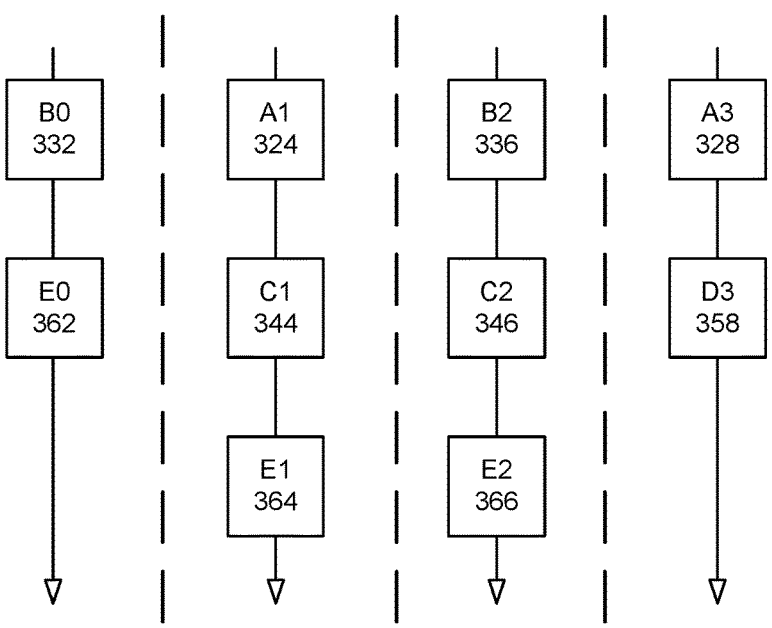
FIG. 5 illustrates an example of a modified data flow graph with unaffected nodes excluded.

While FIG. 4 still shows the unaffected invocations, the unaffected invocations can be ignored when determining dependencies between invocations, as shown in FIG. 5. FIG. 5 illustrates an example of a modified data flow graph 510 with unaffected nodes excluded. Looking at FIG. 3, the invocations associated with node E 260 include E0 362, E1 364, E2 366, and E3 368. Looking at the data flow graph 210, node E 260 depends on node C 240. Then, looking at the affects mask 265 and the affects mask 245, the segments that are modified by node C and node E include the segments corresponding to segments 267, 268. In such an example, a pipeline process that includes the invocation for segment 267 can include the invocations for node E 260 and node C 240. A dependency can be illustrated with a first edge between E1 364 and C1 344. Another dependency can be illustrated with a second edge between E2 366 and C2 346. Such a procedure can continue at each node until a node that does not include a parent is reached.

B. Affects Masks and Connection Mask Example

Figure 6:
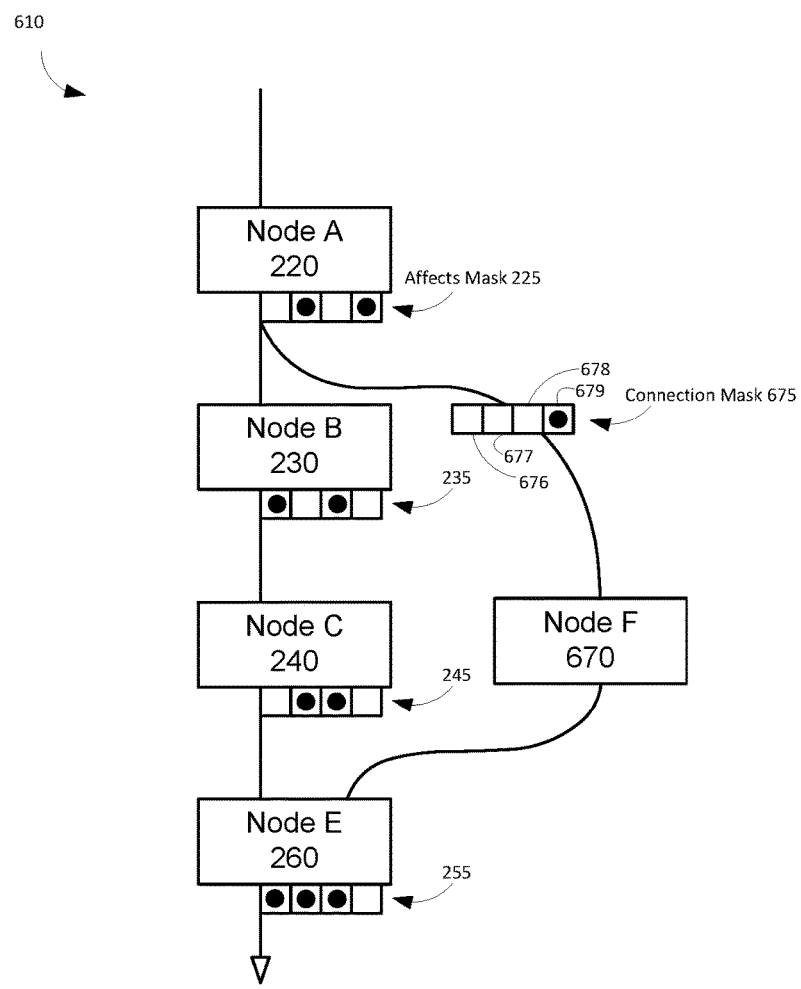
FIG. 6 illustrates an example of a data flow graph with affects masks and a connection mask.

FIG. 6 illustrates an example of a data flow graph 610 with affects masks and a connection mask. The data flow graph 610 is similar to the data flow graph 210, except the data flow graph 610 includes a connection mask 675 and a node F 670 instead of a node D 250. The connection mask 675 can include segments 676, 677, 678, 679. The connection mask 675 can be associated with the flow of data elements from node A 220 and node F 670. In particular, because the connection mask 275 identifies segment 679, the connection mask 275 can indicate that the segment 679 is required as input to node F 670.

As shown in the data flow graph 610, node F 670 does not include an affects mask. By not including an affects mask, node F 670 can indicate that one or more functions associated with node F 670 do not modify a data element. In such an example, node F 670 can use data elements to compute a result that is not associated with a particular data element. For example, a function associated with node F 670 can compute a mean of two data elements in segment 679. The result would not modify a particular data element. Therefore, node F 670 would not be associated with an affects mask.

Figure 7:
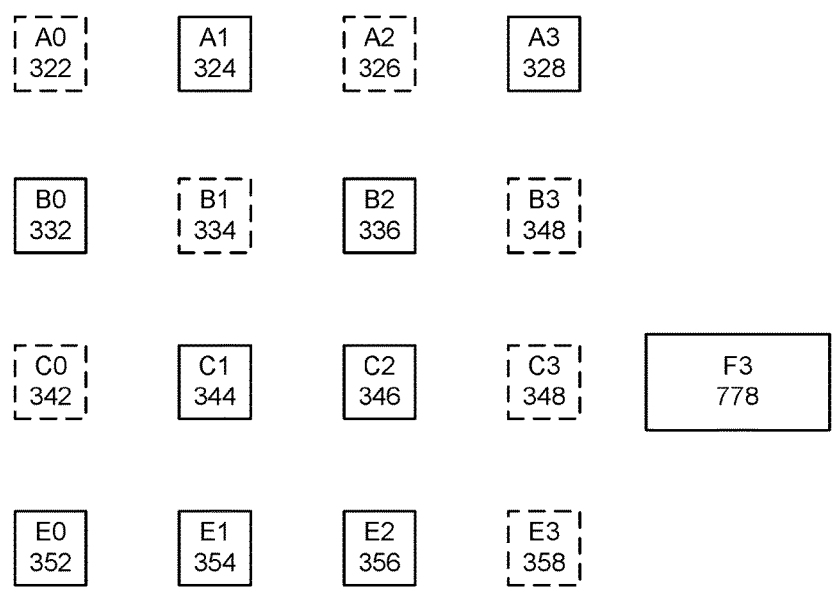
FIG. 7 illustrates an example of node invocations for a data flow graph with affects masks and a connection mask.

FIG. 7 illustrates an example of node invocations for a data flow graph 610. While the invocations for the data flow graph 210 are similar to the invocations for the data flow graph 610, there is a difference regarding node F 670. Rather than generating four invocations for node F 670, a single invocation can be generated for node F 670. Therefore, F3 778 is generated for node F 670.

Figure 8:
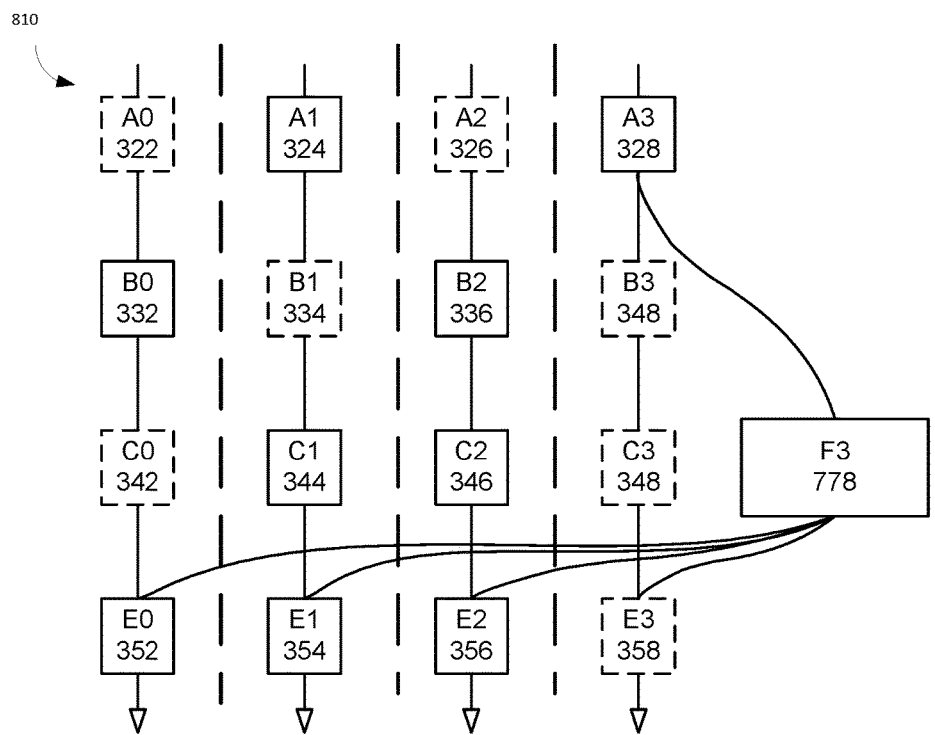
FIG. 8 illustrates an example of a modified data flow graph with affects masks, a connection mask, and unaffected nodes included.

FIG. 8 illustrates an example of a modified data flow graph 810 with affects masks, a connection mask, and unaffected nodes included. Again, dependencies determined for node invocations of the data flow graph 210 are similar to those for the data flow graph 610. The difference is regarding node F 670. As can be seen in FIG. 8, F3 778 can be included in the fourth pipeline process because invocations generated solely from a connection mask can be associated with the pipeline process that is associated with the segment received by the node. However, even though there is not an affects mask associated with node F 670 to compare with the affects mask 255, all invocations of node E can include an edge to F3 778 because a segment that requires the output of node F 670 cannot be determined based on affects masks, connection masks, and dependencies between nodes.

Figure 9:
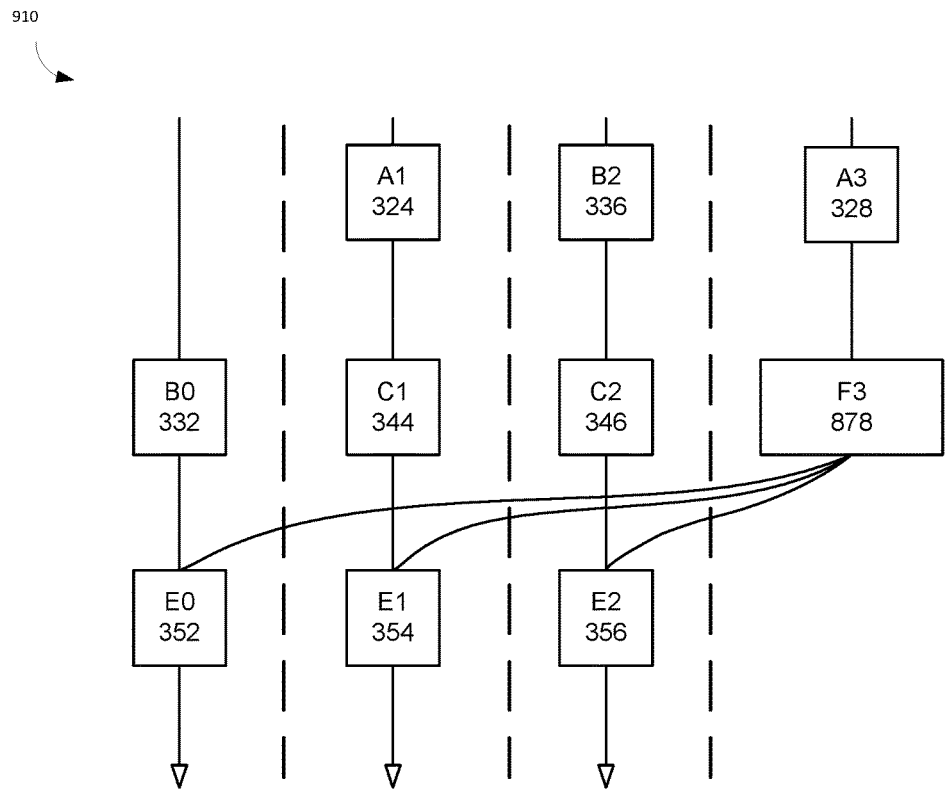
FIG. 9 illustrates an example of a modified data flow graph with affects masks, a connection mask, and unaffected nodes excluded.

Again, while FIG. 8 still shows the unaffected invocations, the unaffected invocations can be ignored when determining dependencies between invocations, as shown in FIG. 9.

C. A Node that Includes Two Inputs Sourcing from the Same Output Example

Figure 10:
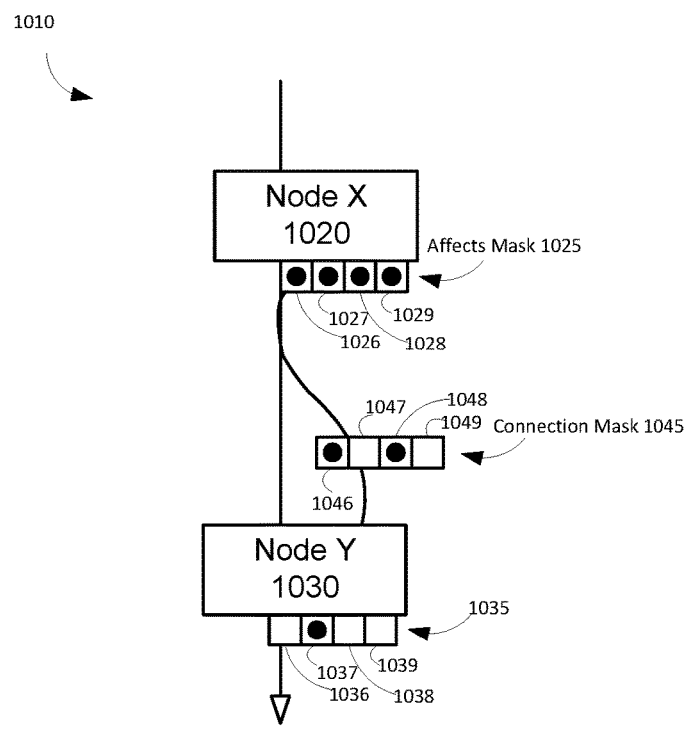
FIG. 10 illustrates an example of a data flow graph with a node that includes two inputs.

FIG. 10 illustrates another example of a data flow graph 1010 with a node that includes two inputs sourcing from the same output. In particular, the data flow graph 1010 includes a node X 1020 and a node Y 1030. Node X 1020 can be associated with an affects mask 1025, which includes indications in segments 1026, 1027, 1028, and 1029. Node Y 1030 is associated with an affects mask 1030, which includes an indication in segment 1037. The data flow graph 1010 further includes a connection mask 1040, which includes indications in segments 1046, 1048.

Figure 11:
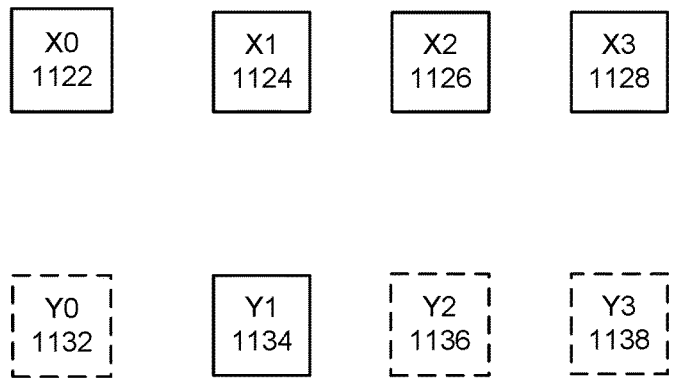
FIG. 11 illustrates an example of node invocations for a data flow graph with a node that includes two inputs sourcing from the same output.

FIG. 11 illustrates an example of a modified data flow graph 1110 with a node that includes two inputs and unaffected nodes included. Node invocations are generated for each of the nodes in the modified data flow graph 1110. However, rather than including an additional invocation for the connection mask 1040, the node invocations can look at just the affects mask when a node includes both an affects mask and a connection mask.

Figure 12:
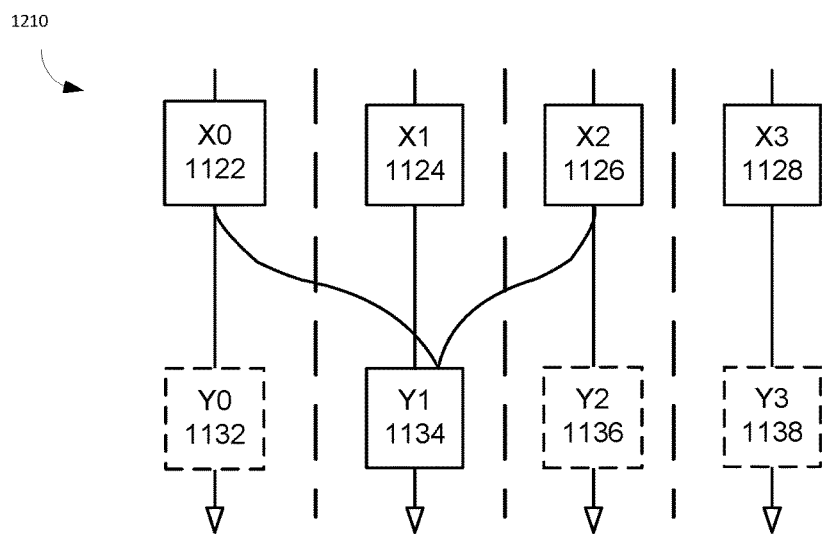
FIG. 12 illustrates an example of a modified data flow graph with a node that includes two inputs and unaffected nodes included.
Figure 13:
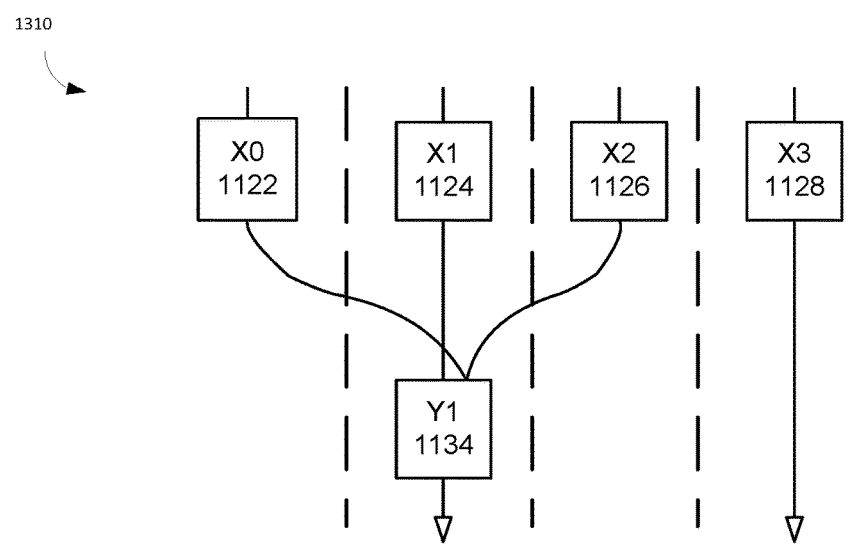
FIG. 13 illustrates an example of a modified data flow graph with a node that includes two inputs and unaffected nodes excluded.

FIG. 12 illustrates an example of a modified data flow graph 1210 with a node that includes two inputs and unaffected nodes included. In particular, the node invocations include the dependencies for the affects masks, which are indicated for example with an edge between X1 1124 and Y1 1134. However, the dependencies included because of the connection mask 1040 generates a first edge between X0 1122 and Y1 1134, and a second edge between X2 1126 and Y1 1134. The first and second edges only connect with Y1 1134, and not Y0 1132, Y2 1136, and Y3 1138 because the execution system can identify that a connection mask combined with an affects mask results in the indications in the affects mask depending on the indications in the connection mask. FIG. 13 illustrates an example of a modified data flow graph 1310 with a node that includes two inputs and unaffected nodes excluded.

VI. System

Figure 15:
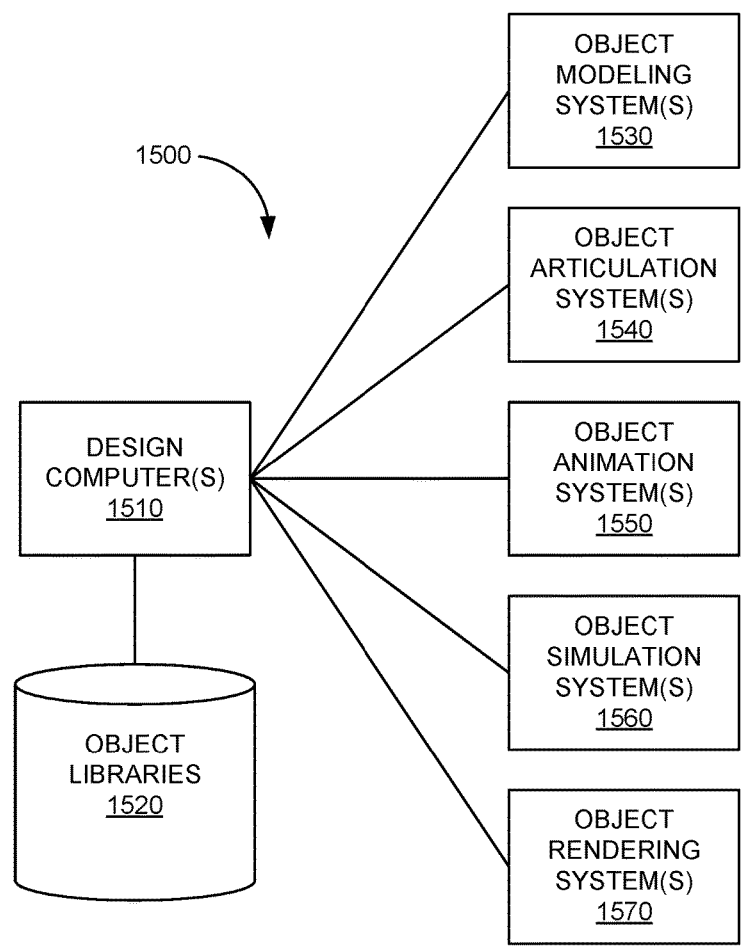
FIG. 15 is a simplified block diagram of a system for creating computer graphics imagery (CGI) and computer-aided animation that may implement or incorporate various embodiments of the present disclosure.

FIG. 15 is a simplified block diagram of system 1500 for creating computer graphics imagery (CGI) and computer-aided animation that may implement or incorporate various embodiments. In this example, system 1500 can include one or more design computers 1510, object library 1520, one or more object modeler systems 1530, one or more object articulation systems 1540, one or more object animation systems 1550, one or more object simulation systems 1560, and one or more object rendering systems 1570. Any of the systems 1530-1570 may be invoked by or used directly by a user of the one or more design computers 1510 and/or automatically invoked by or used by one or more processes associated with the one or more design computers 1510. Any of the elements of system 1500 can include hardware and/or software elements configured for specific functions.

The one or more design computers 1510 can include hardware and software elements configured for designing CGI and assisting with computer-aided animation. Each of the one or more design computers 1510 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 1510 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 1510 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 1510 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 1510 acting as an animator may employ one or more systems or tools to specify motion and position of one or more objects over time to produce an animation.

Object library 1520 can include elements configured for storing and accessing information related to objects used by the one or more design computers 1510 during the various stages of a production process to produce CGI and animation. Some examples of object library 1520 can include a file, a database, or other storage devices and mechanisms. Object library 1520 may be locally accessible to the one or more design computers 1510 or hosted by one or more external computer systems.

Some examples of information stored in object library 1520 can include an object itself, metadata, object geometry, object topology, rigging, control data, animation data, animation cues, simulation data, texture data, lighting data, shader code, or the like. An object stored in object library 1520 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 1530 can include hardware and/or software elements configured for modeling one or more objects. Modeling can include the creating, sculpting, and editing of an object. In various embodiments, the one or more object modeling systems 1330 may be configured to generate a model to include a description of the shape of an object. The one or more object modeling systems 1530 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 1530 may further generate model data (e.g., 2D and 3D model data) for use by other elements of system 1500 or that can be stored in object library 1520. The one or more object modeling systems 1530 may be configured to allow a user to associate additional information, metadata, color, lighting, rigging, controls, or the like, with all or a portion of the generated model data.

The one or more object articulation systems 1540 can include hardware and/or software elements configured to articulating one or more computer-generated objects. Articulation can include the building or creation of rigs, the rigging of an object, and the editing of rigging. In various embodiments, the one or more articulation systems 1540 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 1540 may further generate articulation data (e.g., data associated with controls or animations variables) for use by other elements of system 1300 or that can be stored in object library 1520. The one or more object articulation systems 1340 may be configured to allow a user to associate additional information, metadata, color, lighting, rigging, controls, or the like, with all or a portion of the generated articulation data.

The one or more object animation systems 1550 can include hardware and/or software elements configured for animating one or more computer-generated objects. Animation can include the specification of motion and position of an object over time. The one or more object animation systems 1550 may be invoked by or used directly by a user of the one or more design computers 1510 and/or automatically invoked by or used by one or more processes associated with the one or more design computers 1510.

In various embodiments, the one or more animation systems 1550 may be configured to enable users to manipulate controls or animation variables or utilized character rigging to specify one or more key frames of animation sequence. The one or more animation systems 1550 generate intermediary frames based on the one or more key frames. In some embodiments, the one or more animation systems 1550 may be configured to enable users to specify animation cues, paths, or the like according to one or more predefined sequences. The one or more animation systems 1550 generate frames of the animation based on the animation cues or paths. In further embodiments, the one or more animation systems 1550 may be configured to enable users to define animations using one or more animation languages, morphs, deformations, or the like.

The one or more object animation systems 1550 may further generate animation data (e.g., inputs associated with controls or animation variables) for use by other elements of system 1300 or that can be stored in object library 1520. The one or more object animation systems 1350 may be configured to allow a user to associate additional information, metadata, color, lighting, rigging, controls, or the like, with all or a portion of the generated animation data.

The one or more object simulation systems 1560 can include hardware and/or software elements configured for simulating one or more computer-generated objects. Simulation can include determining motion and position of an object over time in response to one or more simulated forces or conditions. The one or more object simulation systems 1560 may be invoked by or used directly by a user of the one or more design computers 1510 and/or automatically invoked by or used by one or more processes associated with the one or more design computers 1510.

In various embodiments, the one or more object simulation systems 1560 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 1560 may be used to simulate the behavior of objects, such as hair, fur, and cloth, in response to a physics model and/or animation of one or more characters and objects within a computer-generated scene.

The one or more object simulation systems 1560 may further generate simulation data (e.g., motion and position of an object over time) for use by other elements of system 1500 or that can be stored in object library 1520. The generated simulation data may be combined with or used in addition to animation data generated by the one or more object animation systems 1550. The one or more object simulation systems 1560 may be configured to allow a user to associate additional information, metadata, color, lighting, rigging, controls, or the like, with all or a portion of the generated simulation data.

The one or more object rendering systems 1570 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 1570 may be invoked by or used directly by a user of the one or more design computers 1510 and/or automatically invoked by or used by one or more processes associated with the one or more design computers 1510. One example of a software program embodied as the one or more object rendering systems 1570 can include PhotoRealistic RenderMan, or PRMan, produced by Pixar Animations Studios of Emeryville, Calif.

In various embodiments, the one or more object rendering systems 1570 can be configured to render one or more objects to produce one or more computer-generated images or a set of images over time that provide an animation. The one or more object rendering systems 1570 may generate digital images or raster graphics images.

In various embodiments, a rendered image can be understood in terms of a number of visible features. Some examples of visible features that may be considered by the one or more object rendering systems 1570 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air), shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 1570 may further render images (e.g., motion and position of an object over time) for use by other elements of system 1500 or that can be stored in object library 1520. The one or more object rendering systems 1570 may be configured to allow a user to associate additional information or metadata with all or a portion of the rendered image.

Figure 16:
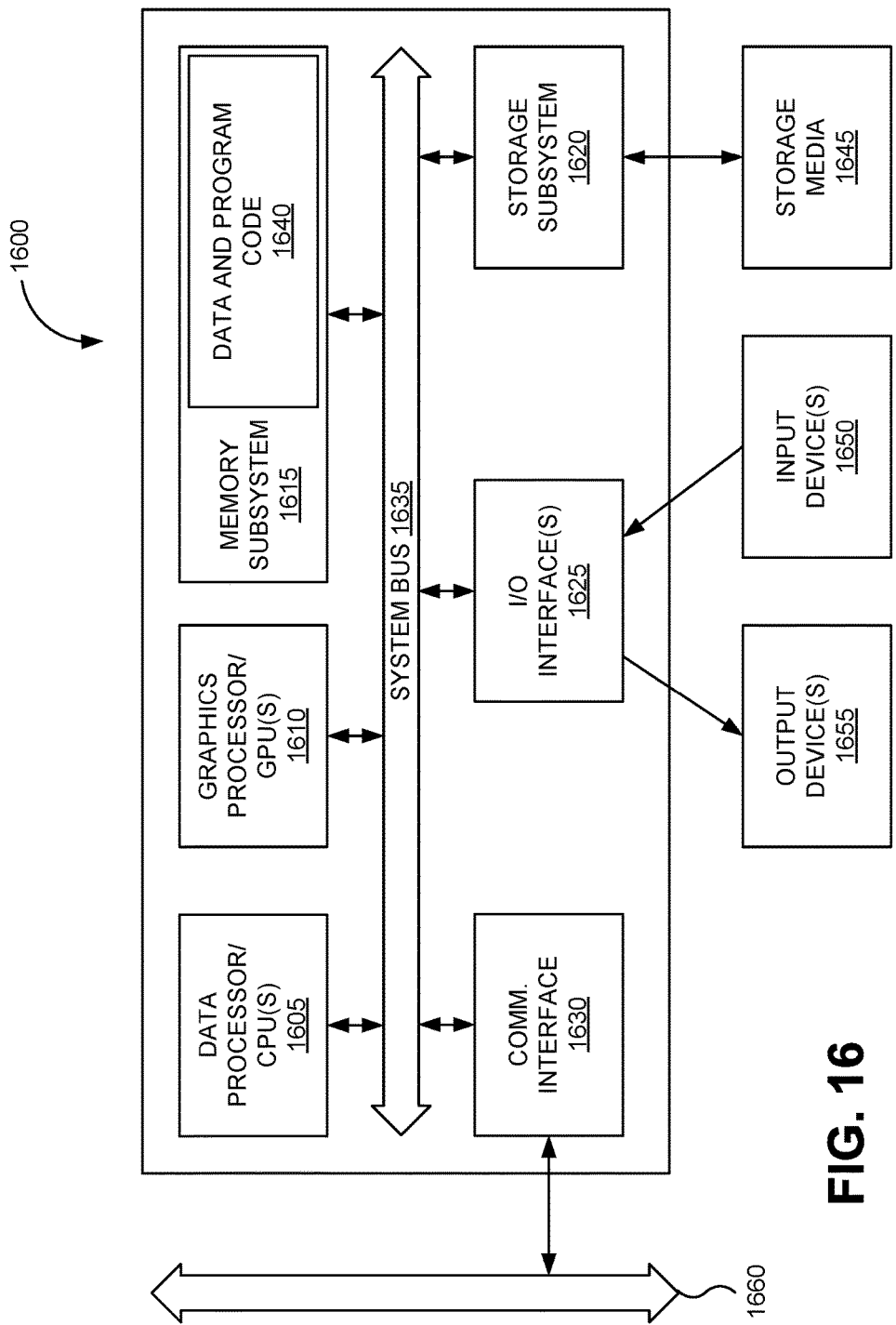
FIG. 16 is a block diagram of a computer system or information processing device that may incorporate an embodiment, be incorporated into an embodiment, or be used to practice any of the innovations, embodiments, and/or examples found within this disclosure.

FIG. 16 is a block diagram of computer system 1600. FIG. 16 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1600 and any of its components or subsystems can include hardware and/or software elements configured for performing methods described herein.

Computer system 1600 may include familiar computer components, such as one or more data processors or central processing units (CPUs) 1605, one or more graphics processors or graphical processing units (GPUs) 1610, memory subsystem 1615, storage subsystem 1620, one or more input/output (I/O) interfaces 1625, communications interface 1630, or the like. Computer system 1600 can include system bus 1635 interconnecting the above components and providing functionality, such connectivity as inter-device communication.

The one or more data processors or central processing units (CPUs) 1605 can execute logic or program code or for providing application-specific functionality. Some examples of CPU(s) 1605 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1610 can execute logic or program code associated with graphics or for providing graphics-specific functionality. GPUs 1610 may include any conventional graphics processing unit, such as those provided by conventional video cards. In various embodiments, GPUs 1610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1610 may include any number of registers, logic units, arithmetic units, caches, memory interfaces, or the like.

Memory subsystem 1615 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1615 can include data and program code 1640.

Storage subsystem 1620 can also store information using machine-readable articles, information storage devices, or computer-readable storage media. Storage subsystem 1620 may store information using storage media 1645. Some examples of storage media 1645 used by storage subsystem 1620 can include floppy disks, hard disks, optical storage media such as CD-ROMS, DVDs and bar codes, removable storage devices, networked storage devices, or the like. In some embodiments, all or part of data and program code 1640 may be stored using storage subsystem 1620.

The one or more input/output (I/O) interfaces 1625 can perform I/O operations. One or more input devices 1650 and/or one or more output devices 1655 may be communicatively coupled to the one or more I/O interfaces 1625. The one or more input devices 1650 can receive information from one or more sources for computer system 1600. Some examples of the one or more input devices 1650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1650 may allow a user of computer system 1600 to interact with one or more non-graphical or graphical user interfaces to enter a comment, select objects, icons, text, user interface widgets, or other user interface elements that appear on a monitor/display device via a command, a click of a button, or the like.

The one or more output devices 1655 can output information to one or more destinations for computer system 1600. Some examples of the one or more output devices 1655 can include a printer, a fax, a feedback device for a mouse or joystick, external storage systems, a monitor or other display device, a communications interface appropriately configured as a transceiver, or the like. The one or more output devices 1655 may allow a user of computer system 1600 to view objects, icons, text, user interface widgets, or other user interface elements. A display device or monitor may be used with computer system 1600 and can include hardware and/or software elements configured for displaying information.

Communications interface 1630 can perform communications operations, including sending and receiving data. Some examples of communications interface 1630 may include a network communications interface (e.g. Ethernet, Wi-Fi, etc.). For example, communications interface 1630 may be coupled to communications network/external bus 1660, such as a computer network, a USB hub, or the like. A computer system can include a plurality of the same components or subsystems, e.g., connected together by communications interface 1630 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1600 may also include one or more applications (e.g., software components or functions) to be executed by a processor to execute, perform, or otherwise implement techniques disclosed herein. These applications may be embodied as data and program code 1640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1615 and/or storage subsystem 1620.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for performing parallel execution of tasks executing on one or more processors of a computer system to concurrently evaluate dependent nodes in a modified data flow graph, the method comprising performing, by the computer system:
   identifying a set of data elements, wherein each data element of the set of data elements corresponds to a respective variable to be evaluated by a computer model defined by a data flow graph, the data flow graph including a first node and a second node that depends from the first node, the first node corresponding to a first operation and associated with a first affects mask indicating which data elements of the set of data elements are modified by the first operation, the second node corresponding to a second operation and associated with a second affects mask indicating which data elements of the set of data elements are modified by the second operation;
   dividing the set of data elements into a plurality of segments, each respective segment including a respective portion of the set of data elements;
   for each segment that includes at least one data element modified by the first node as indicated by the first affects mask:
      generating an invocation of the first node for performing the first operation on the segment, wherein the generated invocation of the first node includes a first invocation for a first segment that is modified by the first node;
   for each segment that includes at least one data element modified by the second node as indicated by the second affects mask:
      generating an invocation of the second node for performing the second operation on the segment, wherein the generated invocation of the second node includes a second invocation for a second segment that is modified by the second node but not by the first node; and
   allocating each of the plurality of segments to a separate pipeline process for executing on at least one of the one or more processors, wherein the first segment is allocated to a first pipeline process, and the second segment is allocated to a second pipeline process; and
   for each pipeline process:
      executing the generated invocations for the corresponding segment for the first node and the second node in an order according to a dependency relationship between the first node and the second node predefined in the data flow graph, wherein the first pipeline process executes the first invocation for the first node concurrently with the second pipeline process executing the second invocation for the second node despite the second node being dependent on the first node.

2. The method of claim 1, wherein a third segment is modified by the first node and by the second node, and wherein the third segment is allocated to a third pipeline process.

3. The method of claim 1, further comprising:
   identifying a third node in the data flow graph, the third node corresponding to a third operation, wherein the third node depends on the second node, wherein a connection between the second node and the third node is associated with a connection mask, wherein the connection mask indicates that a data element of the set of data elements is input to the third node, and wherein the third node does not use data elements of another segment to perform the third operation on any segment; and
   for a segment that includes the data element that is input to the third node, as indicated by the connection mask, generating an invocation of the third node for performing the third operation on the segment.

4. The method of claim 1, further comprising:
   identifying a third node in the data flow graph, the third node corresponding to a third operation, wherein the third node depends on the second node, wherein the third node is associated with a third affects mask, wherein the third affects mask indicates which data elements of the set of data elements are modified by the third node, wherein a connection between the second node and the third node is associated with a connection mask, wherein the connection mask indicates that a data element of the set of data elements is input to the third node, and wherein the third node does not use data elements of another segment to perform the third operation on any segment; and
   for each segment that includes at least one data element modified by the third node as indicated by the third affects mask:
      generating an invocation of the third node for performing the third operation on the segment; and
      establishing a dependency between the invocation and an invocation that outputs a segment that includes the data element that is input to the third node.

5. The method of claim 1, wherein each pipeline process is evaluated as a separate task.

6. The method of claim 1, further comprising:
   for each segment that does not include at least one data element modified by the first node as indicated by the first affects mask:
      not generating an invocation of the first node for performing the first operation on the segment; and
   for each segment that does not include at least one data element modified by the second node as indicated by the second affects mask:
      not generating an invocation of the second node for performing the second operation on the segment.

7. The method of claim 1, wherein each pipeline process is executed using the affects mask.

8. The method of claim 1, wherein the data flow graph includes a number of levels of dependency, wherein a level of dependency indicates a node of the data flow graph that depends on another node of the data flow graph, and wherein each of the pipeline processes has at least one level of dependency less than the number of levels of dependency included in the data flow graph.

9. A system comprising:
   a plurality of processors, wherein one or more of the plurality of processors is configured to:
      identify a set of data elements, wherein each data element of the set of data elements corresponds to a respective variable to be evaluated by a computer model defined by a data flow graph, the data flow graph including a first node and a second node that depends from the first node, the first node corresponding to a first operation and associated with a first affects mask indicating which data elements of the set of data elements are modified by the first operation, the second node corresponding to a second operation and associated with a second affects mask indicating which data elements of the set of data elements are modified by the second operation;

divide the set of data elements into a plurality of segments, each respective segment including a respective portion of the set of data elements;

for each segment that includes at least one data element modified by the first node as indicated by the first affects mask:
  generate an invocation of the first node for performing the first operation on the segment, wherein the generated invocation of the first node includes a first invocation for a first segment that is modified by the first node;

for each segment that includes at least one data element modified by the second node as indicated by the second affects mask:
  generate an invocation of the second node for performing the second operation on the segment, wherein the generated invocation of the second node includes a second invocation for a second segment that is modified by the second node and not by the first node; and allocate each of the plurality of segments to a separate pipeline process for executing on at least one of the plurality of processors, wherein the first segment is allocated to a first pipeline process, and the second segment is allocated to a second pipeline process, wherein each pipeline process is associated with a processor of the plurality of processors; and for each pipeline process:
  execute the generated invocations for the corresponding segment for the first node and the second node in an order according to a dependency relationship between the first node and the second node pre-defined in the data flow graph, wherein the first pipeline process executes the first invocation for the first node concurrently with the second pipeline process executing the second invocation for the second node despite the second node being dependent on the first node.

10. The system of claim 9, wherein a third segment is modified by the first node and by the second node, and wherein the third segment is allocated to a third pipeline process.

11. The system of claim 9, further comprising instructions that, when executed by the plurality of processors, cause the plurality of processors to perform operations including:
  identifying a third node in the data flow graph, the third node corresponding to a third operation, wherein the third node depends on the second node, wherein a connection between the second node and the third node is associated with a connection mask, wherein the connection mask indicates that a data element of the set of data elements is input to the third node, and wherein the third node does not use data elements of another segment to perform the third operation on any segment; and
  for a segment that includes the data element that is input to the third node, as indicated by the connection mask, generating an invocation of the third node for performing the third operation on the segment.

12. The system of claim 9, further comprising instructions that, when executed by the plurality of processors, cause the plurality of processors to perform operations including:
  identifying a third node in the data flow graph, the third node corresponding to a third operation, wherein the third node depends on the second node, wherein the third node is associated with a third affects mask, wherein the third affects mask indicates which data elements of the set of data elements are modified by the third node, wherein a connection between the second node and the third node is associated with a connection mask, wherein the connection mask indicates that a data element of the set of data elements is input to the third node, and wherein the third node does not use data elements of another segment to perform the third operation on any segment; and
  for each segment that includes at least one data element modified by the third node as indicated by the third affects mask:
    generating an invocation of the third node for performing the third operation on the segment; and
    establishing a dependency between the invocation and an invocation that outputs a segment that includes the data element that is input to the third node.

13. The system of claim 9, wherein each pipeline process is evaluated as a separate task.

14. The system of claim 9, further comprising instructions that, when executed by the plurality of processors, cause the plurality of processors to perform operations including:
  for each segment that does not include at least one data element modified by the first node as indicated by the first affects mask:
    not generating an invocation of the first node for performing the first operation on the segment; and
  for each segment that does not include at least one data element modified by the second node as indicated by the second affects mask:
    not generating an invocation of the second node for performing the second operation on the segment.

15. The system of claim 9, wherein each pipeline process is executed using the affects mask.

16. A computer product comprising a non-transitory machine-readable storage medium, including instructions that, when executed by a plurality of processors, cause one or more processors of the plurality of processors to:
  identify a set of data elements, wherein each data element of the set of data elements corresponds to a respective variable to be evaluated by a computer model defined by a data flow graph, the data flow graph including a first node and a second node that depends from the first node, the first node corresponding to a first operation and associated with a first affects mask indicating which data elements of the set of data elements are modified by the first operation, the second node corresponding to a second operation and associated with a second affects mask indicating which data elements of the set of data elements are modified by the second operation;
  divide the set of data elements into a plurality of segments, each respective segment including a respective portion of the set of data elements;
  for each segment that includes at least one data element modified by the first node as indicated by the first affects mask:
    generate an invocation of the first node for performing the first operation on the segment, wherein the generated invocation of the first node includes a first invocation for a first segment that is modified by the first node;

for each segment that includes at least one data element
  modified by the second node as indicated by the second
  affects mask:
  generate an invocation of the second node for performing the second operation on the segment, wherein the
    generated invocation of the second node includes a
    second invocation for a second segment that is
    modified by the second node and not by the first
    node; and
  allocate each of the plurality of segments to a separate
    pipeline process for executing on at least one of the one
    or more processors, wherein the first segment is allocated to a first pipeline process, and wherein the second
    segment is allocated to a second pipeline process,
    wherein each pipeline process is associated with a
    processor of the plurality of processors; and
  for each pipeline process:
    execute the generated invocations for the corresponding segment for the first node and the second node in
      an order according to a dependency relationship
      between the first node and the second node predefined in the data flow graph, wherein the first
      pipeline process executes the first invocation for the
      first node concurrently with the second pipeline
      process executing the second invocation for the
      second node despite the second node being dependent on the first node.

17. The computer product of claim 16, wherein a third segment is modified by the first node and by the second node, and wherein the third segment is allocated to a third pipeline process.

18. The computer product of claim 16, further including instructions that, when executed by the one or more processors, cause the one or more processors to:
  identifying a third node in the data flow graph, the third
    node corresponding to a third operation, wherein the
    third node depends on the second node, wherein a
    connection between the second node and the third node
    is associated with a connection mask, wherein the
    connection mask indicates that a data element of the set
    of data elements is input to the third node, and wherein
    the third node does not use data elements of another
    segment to perform the third operation on any segment;
    and
  for a segment that includes the data element that is input
    to the third node, as indicated by the connection mask,
    generating an invocation of the third node for performing the third operation on the segment.

19. The computer product of claim 16, further including instructions that, when executed by the one or more processors, cause the one or more processors to:
  identifying a third node in the data flow graph, the third
    node corresponding to a third operation, wherein the
    third node depends on the second node, wherein the
    third node is associated with a third affects mask,
    wherein the third affects mask indicates which data
    elements of the set of data elements are modified by the
    third node, wherein a connection between the second
    node and the third node is associated with a connection
    mask, wherein the connection mask indicates that a
    data element of the set of data elements is input to the
    third node, and wherein the third node does not use data
    elements of another segment to perform the third
    operation on any segment; and
  for each segment that includes at least one data element
    modified by the third node as indicated by the third
    affects mask:
    generating an invocation of the third node for performing the third operation on the segment; and
    establishing a dependency between the invocation and
      an invocation that outputs a segment that includes
      the data element that is input to the third node.

20. The computer product of claim 16, wherein each pipeline process is evaluated as a separate task.

21. The computer product of claim 16, further including instructions that, when executed by the one or more processors, cause the one or more processors to:
  for each segment that does not include at least one data
    element modified by the first node as indicated by the
    first affects mask:
    not generating an invocation of the first node for
      performing the first operation on the segment; and
  for each segment that does not include at least one data
    element modified by the second node as indicated by
    the second affects mask:
    not generating an invocation of the second node for
      performing the second operation on the segment.

* * * * *